United States Patent Office 3,192,242
Patented June 29, 1965

3,192,242
2,2-BIS(HALOMETHYL)-1,3-PROPYLENEBIS(PHOSPHORODIHALIDATES) AND HALOGENATED DIPHOSPHATE ESTERS THEREOF
Gail H. Birum, Kirkwood, Mo., assignor to Monsanto Company, a corporation of Delaware
No Drawing. Filed Mar. 7, 1962, Ser. No. 177,964
28 Claims. (Cl. 260—461)

This invention relates to the preparation of flame-retardant organic phosphorus compounds. More specifically, this invention provides a new and useful process for preparing new halogen-containing organophosphorus compounds and for preparing improved flame-retardant organophosphorus chemicals.

Some of the monomeric halogenated organophosphorus compounds of this invention are polymerizable either alone or in admixture with other polymerizable organic compounds. This invention includes the preparation of polymeric materials from such compounds of this invention.

It is one object of this invention to provide improved flame-retardant or fire-resistant organophosphorus compounds which are useful as intermediates in preparing improved flame-retardant chemicals.

It is a further object of this invention to provide new halogen-containing organophosphorus compounds having improved flame-retardant properties in polymer compositions.

It is yet another object of this invention to provide an economical process for preparing improved halogen-containing organophosphorus flame-retardant chemicals.

Another object of this invention is to provide a novel group of polymerizable halogen-containing organophosphorus esters.

Yet another object of this invention is to provide homopolymers of certain polymerizable halogen-containing organophosphorus esters.

Other objects, aspects, and advantages of this invention will be apparent from a reading of the following specification and its appended claims.

It has been found according to this invention that new and valuable organophosphorus compounds can be prepared by the treatment of (a) the reaction product of pentaerythritol and a trivalent phosphorus trihalide such as phosphorus tribromide or phosphorus trichloride with (b) a halogen such as bromine or chlorine. The compounds so obtained (c) are valuable for many purposes but are particularly valuable as intermediates for preparing halogen-containing organophosphorus esters. The compounds so obtained may be reacted with an epoxide compound to obtain new halogen-containing organophosphorus compounds which are particularly suited for use in flame-retardant applications.

According to one aspect of this invention, there are provided, as new compounds, halogen-containing organophosphorus compounds of the formula (I)   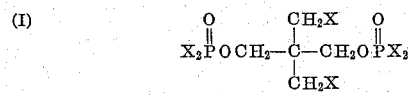

wherein each X denotes a halogen such as chlorine or bromine.

Further, according to another aspect of this invention, there are provided, as new compounds, halogen-containing organophosphorus esters of the formula (II)   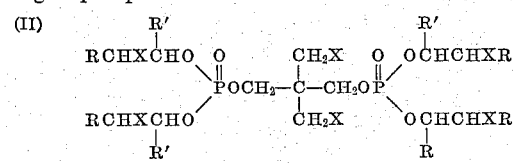

wherein each X denotes a halogen such as chlorine or bromine; R is preferably selected from the group consisting of hydrogen, hydrocarbyl, halohydrocarbyl, hydrocarbyloxyalkyl, and hydrocarbyl-C(O)O-alkyl radicals; and R' is preferably selected from the group consisting of hydrogen, lower alkyl, and lower halo-alkyl radicals, which are defined herein as having from 1 to 6 carbons, and is hydrogen when R is defined as being a hydrocarbyloxyalkyl or a hydrocarbyl-C(O)O-alkyl group. As is indicated further in the specification, R and R' may, in some cases, be interchanged or transposed depending upon how the ring opening of the epoxide reactant occurs.

Another aspect of this invention is the provision of a process whereby compounds having the above general Formulae I and II are prepared. In accordance with this aspect of the invention, that is, according to the process of this invention, compounds described by the above general Formula I are prepared first by the reaction of a halogen such as bromine or chlorine with the reaction product of pentaerythritol and a trivalent phosphorus trihalide such as phosphorus trichloride or phosphorus tribromide. Following this, the reaction product containing a compound of type I described above may be contacted and reacted with a compound characterized by the formula

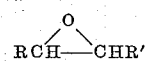

wherein R and R' are as defined above, to obtain flame-retardant chemicals, the main product of which has a structure in conformity with general Formula II above.

The main reaction product of pentaerythritol and a phosphorus trihalide, which reaction product is a starting material in the preparation of compounds of this invention, is the pentaerythritol ester of phosphorohalidous acid having the following general formula:

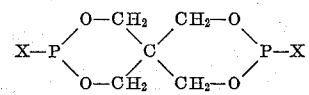

where X is bromine or chlorine. Hence, the reactions of the process of this invention may be summarized according to the following general equations:

(A) 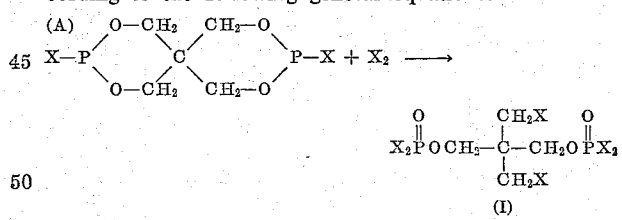

(B) 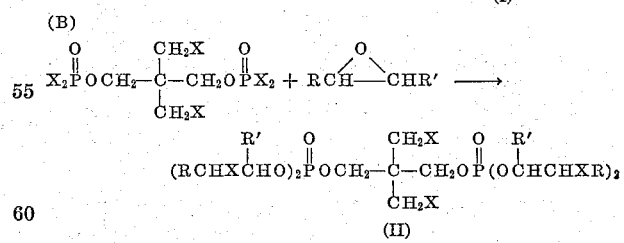

wherein X, and R and R' are as defined above.

For preparing compounds of type (I) above according to process step (A), the reaction product of pentaerythritol and a trivalent phosphorus trihalide, that is, the pentaerythritol ester of phosphorochloridous acid, is treated with chlorine or bromine. In this reaction the cyclic structures of the starting material are cleaved, and an atom of chlorine or bromine adds to each of the phosphorus atoms thereof as well as to the carbon atoms which are cleaved from the oxygen atoms of each of the heterocyclic rings. For example, when bromine is added to the reaction product of pentaerythritol and phosphorus trichloride, the main product resulting from the reaction which occurs has the structure

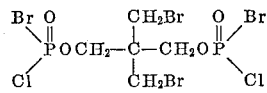

Similarly, when chlorine is added to such a reaction product, the main product is a compound of the formula

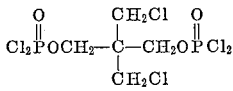

In preparing compounds of type (II) of this invention according to process step (B), the product resulting from the reaction of halogen with the reaction product of pentaerythritol and a trivalent phosphorus trihalide, having as the main product a compound of type (I) described above, is treated with a compound characterized by the formula

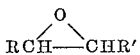

wherein R and R' are as defined above. For example, when an alkylene epoxide such as ethylene oxide is used, the reaction takes place by cleavage of the oxirane ring and bonding of the cleaved

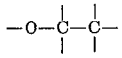

chain through oxygen to a phosphorus atom of the diphosphorodihalidate (compound of type I), the bromine or chlorine atoms initially bonded to phosphorus adding to the other ends of such chains. For example, when propylene oxide is added to a product obtained by reacting bromine with the reaction product of pentaerythritol and phosphorus trichloride, described above, the main product obtained has the formula

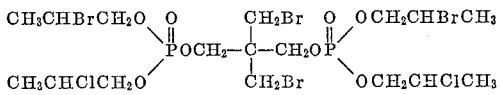

Compounds of the type having the general Formula I, that is, those compounds obtained by reacting a halogen such as chlorine or bromine with the reaction product of pentaerythritol and a trivalent phosphorus trihalide such as phosphorus tribromide or phosphorus trichloride, may be referred to generally as 2,2-bis(halomethyl)-1,3-propylenebis(phosphorodihalidates). Examples of such compounds are:

2,2 - bis(chloromethyl) - 1,3 - propylenebis(phosphorodichloridate) obtained by reaction of chlorine with the reaction product of pentaerythritol and phosphorus trichloride;

2,2 - bis(chloromethyl) - 1,3 - propylenebis(phosphorobromidochloridate) obtained by reaction of chlorine with the reaction product of pentaerythritol and phosphorus tribromide;

2,2 - bis(bromomethyl) - 1,3 - propylenebis(phosphorobromidochloridate) obtained by reaction of bromine with the reaction product of pentaerythritol and phosphorus trichloride; and 2,2 - bis(bromomethyl) - 1,3 - propylenebis(phosphorodibromidate) obtained by reaction of bromine with the reaction product of pentaerythritol and phosphorus tribromide.

In preparing halogenated organophosphorus compounds of type (II) above, the bis(halomethyl)-1,3-propylenebis (phosphorodihalidates) are contacted with an epoxy compound of the formula

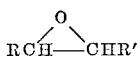

wherein R and R' are as defined above. Oxirane compounds having terminal epoxy groups, that is, epoxy compounds of the above type wherein R' is hydrogen, are usually preferred. However, for many applications pure products are not essential and in such cases products containing isomeric compounds may be used as effectively as a pure material. In such cases, the choice of epoxide to be used is much wider. Various aliphatic, aromatic, and alicyclic groups may be attached directly to the epoxy groups or said groups may be attached through a hydrocarbyloxyalkyl or a hydrocarbyl-C(O)O-alkyl group to the epoxy group. It is preferred that R and R' be so selected that the oxirane reactant has from 2 to 12 carbon atoms per molecule. However, oxirane compounds having from 2 to 12 carbon atoms are only stated as a preferred form of the invention, and epoxide compounds having R and R' so selected that the total carbon atom content of the epoxide reactant is greater than 12 are operative. Compounds of this type are especially preferred when only part of the halogen atoms on the phosphorus atoms of the compounds of type I are to be replaced, initially, and the remaining phosphorus-bonded halogen atoms are to be reacted with an epoxide having fewer carbon atoms than 12 so that the average carbon content of each of the ester radicals of the diphosphate final product is about 12 carbon atoms or less. Such higher molecular weight epoxides of the above type having, say, up to 20 carbon atoms may be preferred as the only epoxide reactant in the preparation of some products of this invention. Compounds of type (II) having an average molecular weight in the range of about 550 to 1400 are of optimum value for most cases in preparing chemicals which are to be added to polymer compositions for decreasing the flammability characteristics of said polymer compositions. Higher molecular weight epoxy compounds may be used, but they increase the molecular weight of the final product proportionally and also increase the time needed to effect complete reaction. Also it is to be understood that compounds of type (II) can be prepared having a preferred molecular weight by choosing to use a higher molecular weight epoxide for reaction with some of the halogen bonded to the phosphorus atoms, and then completing the synthesis with a lower molecular weight epoxide to replace the remaining 1, 2, or 3 halogen atoms from the phosphorus atoms in the bis(halomethyl)propylenebis(phosphorodihalidate) compounds.

Examples of simple useful oxirane compounds that may be used are ethylene oxide, propylene oxide, mixtures of the two, epichlorohydrin, epibromohydrin, epifluorohydrin, phenyl glycidyl ether, and butadiene monoxide.

Additional illustrative examples of oxirane reactants of the above indicated type that may be used to prepare compounds of type (II) defined above are those having the epoxy group in terminal positions in the compounds. Examples of those types wherein R' is hydrogen and R is a hydrocarbyl, or a halohydrocarbyl radical, are those wherein R is an alkyl, alkenyl, alkynyl, cycloalkyl, cycloalkenyl, aryl, aralkyl, alkaryl radical or a halogenated derivative thereof, preferably a chlorinated or brominated radical of the above types. Such compounds include 1,2-epoxybutane, 1,2-epoxypentane, 1,2-epoxyheptane, 1,2-epoxydecane, 1,2-epoxydodecane, 1,2-epoxytetradecane, 1,2-epoxyoctadecane, 1,2-epoxy-4-bromobutane, 1,2-epoxy-6-bromohexane, 1,2 - epoxy - 4 - chlorononane, 1,2-epoxy-6-bromododecane, 1,2-epoxy-5-hexene, 1,2-epoxy-8-nonene, 1,2 - epoxy - 7 - undecene, 1,2 - epoxy-6-bromo-4-hexene, 1,2-epoxy-4-chloro-6-heptene, 1,2-epoxy-8-chloro-10-dodecene, 1,2-epoxy-4-pentyne, 1,2-epoxy-5-hexyne, 1,2-epoxy-8-decyne, 1,2-epoxy-11-dodecyne, 1,2-epoxy-3-chloro-4-hexyne, 1,2-epoxy-8-bromo-10-undecyne, 1,2 - epoxy - 3 - cyclohexylpropane, 1,2-epoxy-4-cyclopentylbutane, 1,2-epoxy-3-(2,4-dichlorocyclohexyl) propane, 1,2-epoxy-3-cyclopropylpropane, 1,2-epoxy-3-cyclobutylpropane, 1,2 - epoxy - 4 - (cyclohexenyl)butane, 1,2-epoxy - 3 - (2,4'-dichlorobiphenylyl)propane, phenyl-ethylene oxide, 2,4,5-tribromophenylethylene oxide, 4-isopropylphenylethylene oxide, 1,2-epoxy-3-(4-vinylphenyl)propane, and 1,2-epoxy-3-(indenyl)propane.

Illustrative examples of useful oxirane compounds of the above type wherein R' is hydrogen and R is a hydrocarbyloxyalkyl radical are 1,2-epoxy-3-ethoxy propane, 1,2-epoxy-4-hexyloxybutane, 1,2-epoxy-4-octyloxybutane, 1,2-epoxy-3-allyloxypropane, 1,2-epoxy-4-propynyloxybutane, 1,1-epoxy-3-cyclohexyloxypropane, 1,2-epoxy-4-(3-cyclohexenyloxy)butane, and 1,2-epoxy-6-(2-phenylethoxy)hexane.

Non-terminal epoxides that can be used include those wherein R and R' are of the same or different types of radicals. Where R and R' are not the same, mixtures of isomeric products will in some cases be obtained. But this fact is not material to the use of the product as a flame-retardant chemical since the isomers possess the same utility. Examples of such reactants are 2,3-epoxybutane, 2,3-epoxypentane, 4,5-epoxyoctane, 2-bromo-3,4-epoxyhexane, 1,8-dichloro-4,5-epoxyoctane, 3,4-epoxy-2-hexene, 1,2-dichloro-3,4-epoxy-1-octene, 3,4-epoxy-1-hexyne, 10-chloro-5,6-epoxy-1-dodecyne, 1-cyclopentyl-3,4-epoxyhexane, 1-chloro-3-(3-cyclohexenyl)-2,3-epoxypropane, 2,3-epoxy-4-phenylbutane, and 3,4-epoxy-4-(p-tolyl)butane.

Epoxy-containing esters of unsaturated carboxylic acids having olefinic or acetylenic bonds may also be used. Examples of such compounds are: glycidyl acrylate, 3,4-epoxybutyl propiolate, 2,3-epoxypropyl alpha-methacrylate, 4,5-epoxypentyl 3-butynoate, 5,6-epoxyhexyl octenoate, 2,3-epoxypropyl undecenoate, 2,3-epoxypropyl oleate, and 3,4-epoxybutyl crotonoate.

By reacting epoxy-containing compounds having unsaturated groups with a 2,2-bis(halomethyl)-1,3-propylenebis(phosphorodihalidate), polymerizable monomers are obtainable. A particularly useful class of epoxy-containing reactants containing unsaturated groups are the epoxy-containing esters of unsaturated acids. Thus, for example, by reacting 1 molar proportion of 2,2-bis(bromomethyl)-1,3-propylenebis(phosphorobromidochloridate) with 2 molar proportions of 3,4-epoxybutyl alpha-methacrylate, and then with 2 molar proportions of ethylene oxide, a polymerizable monomer, 2,2-bis(bromomethyl)-1,3-propylenebis[2-bromo-4-methacrylyloxybutyl 2-chloroethyl phosphate], is obtained. Similarly, by reacting 1 molar proportion of 2,2-bis(bromomethyl)-1,3-propylenebis(phosphorodibromidate) with 4 molar proportions of glycidyl crotonoate, there is obtained 2,2-bis(bromomethyl)-1,3-propylenebis[bis(2-bromo-3-crotonyloxypropyl) phosphate].

When polymerizable halogenated diphosphate ester monomers are being prepared, the 2,2-bis(halomethyl)-1,3-propylenebis(phosphorodihalidate) and appropriate epoxide reactants are admixed preferably in the presence of a catalyst, diluent or solvent, and a polymerization inhibitor of any type that is suitable for inhibiting polymerization of the diphosphate ester product being prepared. Polymerization inhibitors such as 1,3,5-trinitrobenzene, hydroquinone, hydroquinone monomethyl ether, tannic acid, cuprous chloride, phenol, naphthols, may be used. The polymerization inhibitor may be added to the reaction mixture by any suitable method, a preferred method being the introduction of the inhibitor admixed with the epoxide reactant.

A few examples of compounds of type II, defined above, and the reactants from which they are obtained by reaction of the indicated bis(halomethyl)propylenebis(phosphorodihalidates) (compounds of type I) with the indicated oxirane compound are:

2,2-bis(chloromethyl)-1,3-propylenebis[bis(2-chloroethyl) phosphate] obtained by reaction of ethylene oxide with 2,2-bis(chloromethyl)-1,3-propylenebis(phosphorodichloridate); 2,2-bis(chloromethyl)-1,3-propylenebis[2-bromopropyl 2-chloropropyl phosphate] obtained by reaction of propylene oxide with 2,2-bis(chloromethyl)-1,3-propylenebis(phosphorobromidochloridate);

2,2-bis(bromomethyl)-1,3-propylenebis[2,3-dichloropropyl 2-bromo-3-chloropropyl phosphate] obtained by reaction of epichlorohydrin with 2,2-bis(bromomethyl)-1,3-propylenebis(phosphorobromidochloridate);

2,2-bis(bromomethyl)-1,3-propylenebis(3-phenoxy-2-chloropropyl 3-phenoxy-2-bromopropyl phosphate) obtained by reaction of phenyl glycidyl ether with 2,2-bis(bromomethyl)-1,3-propylenebis(phosphorobromidochloridate); and 2,2-bis(bromomethyl)-1,3-propylenebis[bis(2-bromo-3-butenyl) phosphate] obtained by reaction of butadienemonoxide with 2,2-bis(bromomethyl)-1,3-propylenebis(phosphorodibromidate).

Additional examples are:

2,2-bis(bromomethyl)-1,3-propylenebis(2-bromo-11-dodecenyl 2-chloro-11-dodecenyl phosphate) obtained by reaction of 1,2-epoxy-11-dodecene with 2,2-bis-(bromomethyl)-1,3-propylenebis(phosphorobromidochloridate); 2,2-bis(chloromethyl)-1,3-propylenebis(2-chloro-4-pentynyl 2-chloroethyl phosphate) obtained by reaction of 2,2-bis(chloromethyl)-1,3-propylenebis-(phosphorodichloridate) with 1,2-epoxy-4-pentyne and then with ethylene oxide; 2,2-bis(bromomethyl)-1,3-propylenebis(2-bromo-3-naphthylpropyl 2-chloropropyl phosphate) obtained by reaction of 2,2-bis(bromomethyl)-1,3-propylenebis(phosphorobromidochloridate) with 1,2-epoxy-3-naphthylpropane and then with propylene oxide; 2,2-bis(bromomethyl)-1,3-propylenebis(2-bromo-6-chlorohexyl 2-bromoethyl phosphate) obtained by reaction of 2,2-bis(bromomethyl)-1,3-propylenebis(phosphorodibromidate) with 1,2-epoxy-6-chlorohexane and with ethlyene oxide; 2,2-bis(chloromethyl)-1,3-propylenebis-[bis(2-chloro-1-methylpropyl) phospate] obtained by reaction of 2,2-bis(chloromethyl)-1,3-propylenebis(phosphorodichloridate) with 2,3-butylene oxide; 2,2-bis(bromomethyl)-1,3-propylenebis(2-bromo-1-butylhexyl 2-chloro-1-butylhexyl phosphate) obtained by reaction of 2,2-bis(bromomethyl)-1,3-propylenebis(phosphorobromidochloridate) with 5,6-epoxydecane.

The following examples illustrate the type of products obtained when the epoxide used is one wherein R is a hydrocarbyloxyalkyl or a hydrocarbylcarboxyalkyl radical:

2,2-bis(chloromethyl)-1,3-propylenebis[bis(2-chloro-3-phenoxypropyl) phosphate] obtained by reaction of 2,2-bis(chloromethyl)-1,3-propylenebis(phosphorodichloridate) with glycidyl phenyl ether;

2,2-bis(bromomethyl)-1,3-propylenebis(2-bromo-5-butenyloxypentyl 2-chloropropyl phosphate) obtained by reacting 2,2-bis(bromomethyl)-1,3-propylenebis(phosphorobromidochloridate) with 1,2-epoxy-4-butenyloxypentane and then with propylene oxide; 2,2-bis(bromomethyl)-1,3-propylenebis(2-bromo-4-propynyloxybutyl 2-bromobutyl) phosphate obtained by reaction of 2,2-bis(bromomethyl)-1,3-propylenebis(phosphorodibromidate) with 1,2-epoxy-3-propynyloxybutane and then with 1,2-epoxybutane; 2,2-bis(bromomethyl)-1,3-propylenebis(2-bromo-3-acrylyloxypropyl 2-chloro-3-acrylyloxypropyl phosphate) obtained by reacting 2,2-bis(bromomethyl)-1,3-propylenebis(phosphorobromidochloridate) with glycidyl acrylate; 2,2-bis(chloromethyl)-1,3-propylenebis(2-chloro-4-octylcarboxybutyl 2-chlorohexyl phosphate) obtained by reaction of 2,2-bis(chloromethyl)-1,3-propylenebis(phosphorodichloridate) with 1,2-epoxy-4-octylcarboxybutane and then with 1,2-epoxyhexane; and 2,2-bis(bromomethyl)-1,3-propylenebis(2-bromo-4-methacrylyloxybutyl 2-bromo-3-chloropropyl phosphate) obtained by reaction of 2,2-bis(bromomethyl)-1,3-propylenebis(phosphorodibromidate) with 1,2-epoxy-4-methacrylyloxybutane and then with epichlorohydrin.

The final product of this invention may contain isomers and some products resulting from side reactions in the intermediate steps of its preparation.

One of these side reactions occurs during the reaction of pentaerythritol and the trivalent phosphorus trihalide and results in the formation of structure (III) which when carried through the steps of the process involving reaction with halogen and then with an epoxy compound of the above types, produces products which are only partially like compounds of type (II) above. The formation of these side-reaction products may be summarized by the following general equations.

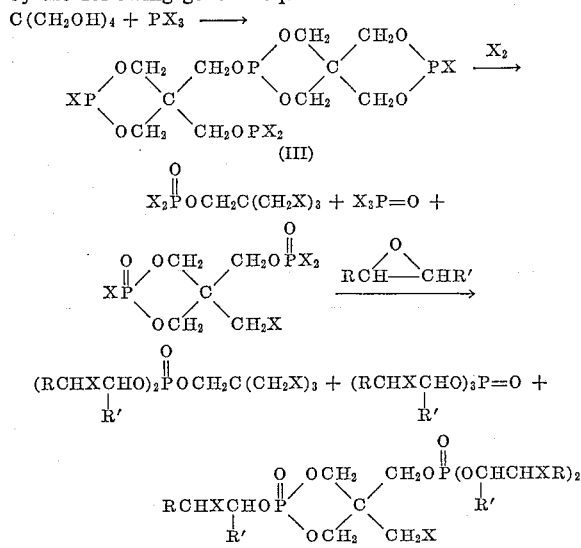

The above side-reaction products may be eliminated by purification of the intermediate pentaerythritol ester of phosphorochloridous acid,

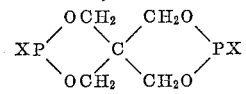

but it is preferred to retain them since they do not appreciably degrade the properties of the final product.

Another side reaction introduces positional isomers as a result of halogen interchange during the reaction of the pentaerythritol-phosphorus trihalide intermediate with elemental halogen that is of a different type than the halogen bonded to phosphorus in the intermediate. For example, when the product from pentaerythritol and PCl$_3$ is treated with Br$_2$, some product having structure IV may be obtained along with the major intermediate V.

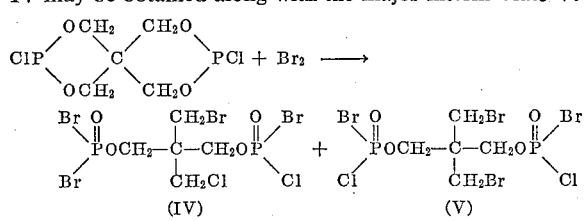

Reaction of a mixture of IV and V with an epoxide then gives a mixture of isomers VI and VII, respectively.

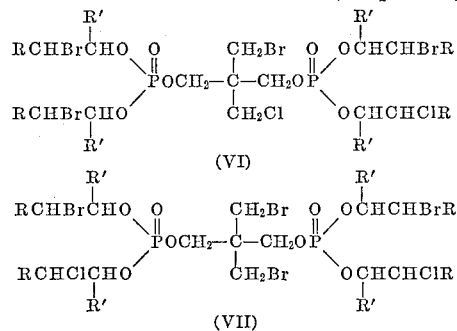

A third type of side reaction is that which introduces isomeric ester radicals bonded to the phosphorus atoms of the final product. This type of side reaction may occur in some instances when the 2,2-bis(halomethyl)-1,3-propylenebis(phosphorodihalidate) compounds (compounds of type I) are reacted with epoxides of the formula

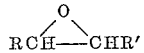

where R and R' are different radicals. This type of isomer does not occur in the product when R and R' are the same. For example, when 2,2-bis(chloromethyl)-1,3-propylenebis(phosphorodichloridate) is reacted with ethylene oxide, that is, with a compound wherein R and R' are both hydrogen atoms, only one type of product is obtained, namely 2,2-bis(chloromethyl)-1,3-propylenebis[bis(2-chloroethyl) phosphate]. However, if the epoxide used is one wherein R and R' are different, isomer mixtures may be obtained. For example, if propylene oxide is reacted with 2,2-bis(bromomethyl)-1,3-propylenebis(phosphorobromidochloridate), there may be obtained besides 2,2-bis(bromomethyl)-1,3-propylenebis[(2-bromopropyl) (2-chloropropyl) phosphate] isomeric products such as 2,2-bis(bromomethyl)-1,3-propylenebis[(2-chloro-1-methylethyl) (2-bromopropyl) phosphate]. Since there is a preferential tendency for cleavage of the epoxy ring to occur between the substituted carbon atom and oxygen, e.g., in cases where R' is hydrogen, the ester radicals of the product are predominantly the β-halo esters of the first indicated type. However, there may be formed also varying proportions of the isomeric products by cleavage of the epoxy ring between the oxygen atom and the unsubstituted carbon.

In view of the above, it will be apparent to those skilled in the art that the invention provides a method of preparing numerous halogenated diphosphate esters having chlorine, bromine, and mixtures of chlorine and bromine as substituents in the epoxide-derived portions of the phosphorus esters.

As already stated, the process of this invention involves the following steps: the reaction product of pentaerythritol and a trivalent phosphorus trihalide is treated with a halogen such as chlorine or bromine to obtain a product of type (I) above. A compound of type (I) is then reacted with an epoxy compound of the above described type to obtain a product of type (II).

A valuable aspect of this invention provides a method for preparing halogenated organic diphosphate esters without isolation of intermediately formed products by starting with pentaerythritol, a trivalent phosphorus trihalide, and chlorine or bromine. Thus, a presently preferred method comprises the following steps: the pentaerythritol and the trivalent phosphorus trihalide are mixed in the presence or absence of a solvent or diluent and warmed until cessation of hydrogen halide evolution. The resulting reaction mixture is treated with chlorine or bromine until reaction is complete as indicated by termination of heat of reaction or cessation of decoloration of halogen. The halogenation product thus obtained is treated with an epoxy compound of the described type to give halogenated organic diphosphate ester products. A diluent or solvent may preferably be used. The reactions of the process can all be effected in one reaction vessel without isolating any intermediate products, except the hydrogen halide evolved in the first step and any diluent or solvent which may have been used. The halogenated organic diphosphate products may be used directly for a variety of industrial and agricultural purposes, but if desired, these products may be purified, e.g., by washing with aqueous alkali and water, by treatment with adsorptive agents, or by filtration.

The pentaerythritol ester of phosphorohalidous acid is, stoichiometrically speaking, the product of 1 molar proportion of pentaerythritol and 2 molar proportions of the phosphorus trichloride or tribromide. To prepare such compounds, it is generally preferred to use a slight excess, say, from 2% to 25% excess, of phosphorus trichloride or tribromide over the amount theoretically required. However it is contemplated within the scope of this invention to use reaction products of pentaerythritol and the phosphorus trihalide derived by using different molar proportions of pentaerythritol to trivalent phosphorus trihalide than the preferred proportions mentioned above. For example, in the process of this invention pentaerythritol-phosphorus trihalide products derived from as little as one and one-third moles of phosphorus trihalide per mole of pentraerythritol may be used. Thus, a reaction product obtained by reacting, say, one mole of pentaerythritol with one and one-half moles of phosphorus trichloride gives an intermediate which may be used within the scope of this invention. However, the use of less than two moles of phosphorus trihalide per mole of pentaerythritol results in all of the halogen being displaced from some of the phosphorus atoms. Such reaction products are complex, difficulty identifiable, and generally of less value for preparing products having flame retardant applications than are those obtained by using the pentaerythritol-trivalent phosphorus reaction products derived by reacting two moles or more of the phosphorus trihalide per mole of pentaerythritol. Nevertheless, where pure products are not essential, such reaction products may be used within the process of this invention to prepare chemical products which are not necessarily equivalent in effectiveness in flame-retardant applications. The description of the invention will proceed by describing the use of the preferred pentaerythritol-trivalent phosphorus trihalide reaction product, but it is understood that it is not intended that the invention should be limited thereto.

Reaction of pentaerythritol with phosphorus trichloride or tribromide proceeds readily with application of moderate warming. Isolation of the reaction products is not required, except for the removal of hydrogen halide by-product, because reaction of the pentaerythritol with phosphorus trihalide proceeds substantially to completion; likewise, the bromination or the chlorination and the subsequent reaction with the epoxy reactant proceeds so smoothly and completely that there is no appreciable deleterious quantities of materials other than the desired halogenated diphosphate esters in the final reaction mixture. Since the halogenation and the epoxide reaction steps both involve addition, no by-product formation is involved. However, if desired, the products of side-reactions, which occur as described above, may be eliminated by purifying the intermediate material, that is, the pentaerythritol ester of phosphorochloridous acid, and then proceeding with the halogenation and the epoxidation steps to obtain a product of type (II). An important aspect of the present invention, then, is the method of preparing mixed halogenated diphosphate esters which comprises addition of chlorine or bromine to the reaction product of pentaerythritol and a trivalent phosphorus trihalide until cessation of bromine or chlorine reaction and then treating the resulting reaction product with an epoxide of the formula

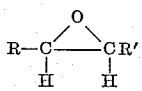

Of course, if desired, the presently provided halogenated diphosphate esters can be prepared wherein all of the halogen in the compounds is chlorine or bromine by using phosphorus trichloride and chlorine or phosphorus tribromide and bromine. However, for flame-retardant purposes, it may be particularly desirable to prepare mixed halogen diphosphate esters by first reacting pentaerythritol with phosphorus trichloride and then treating the resulting reaction product with elemental bromine until discoloration ceases, and finally, treating the resulting reaction product with an epoxide of the described types to form the chlorine and bromine containing esters. Conversely, products may be obtained by first allowing pentaerythritol and phosphorus tribromide to react, and then treating the resulting reaction product with elemental chlorine and finally with an epoxy compound as above.

Where the 2,2-bis(halomethyl)-1,3-propylenebis(phosphorodihalidates) that is, the compounds of type (I), have been prepared so as to contain both bromine and chlorine bonded to phosphorus, halogenated diphosphate esters [compounds of type (II)] having different ester radicals can be prepared in a simple manner by taking advantage of the fact that bromine atoms bonded to phosphorus react with epoxides preferentially to the chlorine atoms bonded to phosphorus. Thus, by reacting a compound such as 2,2-bis(bromomethyl) - 1,3 - propylenebis-(phosphorobromidochloridate) with an epoxide such as 2,3-butylene oxide in an amount which is equivalent to the bromine bonded to phosphorus atoms until reaction is complete, and then with an epoxide such as 1,2-epoxy-3-allyloxypropane in an amount equivalent to the chlorine bonded to phosphorus, there is obtained as the main product 2,2 - bis(bromomethyl)-1,3-propylenebis[2-bromo-1-methylpropyl 2-chloro-3-allyloxypropyl phosphate].

In preparing the 2,2-bis(halomethyl)-1,3-propylenebis-(phosphorodihalidates), the elemental halogen is added to the reaction product of pentaerythritol and phosphorus trihalide until the reaction is complete, e.g., as is indicated by the cessation of discoloration of the added halogen and/or by the cessation of heat of reaction. So long as the reaction is taking place, the halogen is decolorized substantially as rapidly as it is added. The reaction may be moderated by means well known to those skilled in the art, e.g., by cooling, by the use of an inert solvent or diluent, by stirring, by a combination of such means, etc. Any temperature at which the desired products are formed without substantial decomposition taking place may be used. Generally, temperatures on the order of −25° C. to 100° C. can be used, the preferred temperature being in the 0° C. to 50° C. range. When the halogen ceases to become decolorized, the halogenation reaction may be said to be complete, that is, the reaction product is mainly a 2,2-bis(halomethyl)-1,3-propylenebis(phosphorodihalidate) having a generic formula of type (I) above.

Since formation of the 2,2-bis(halomethyl)-1,3-propylenebis(phosphorodihalidate) takes place by reaction of 1 mole of the pentaerythritol ester of phosphorochloridous acid with two moles of the halogen, these reactants are advantageously used in such stoichiometric proportions. An excess of halogen can be used, of course, since such an excess would involve only the necessity of removing the unreacted material from the halogenation product.

The presently provided 2,2-bis(halomethyl)-1,3-propylenebis(phosphorodihalidates) are stable, well-characterized compounds which are also advantageously employed for purposes other than for the preparation of the halogen-containing phosphate esters of this invention. The chlorine and bromine atoms which are attached to the phosphorus atoms are both very reactive; hence, esters may be prepared therefrom by reaction with alcohols or mercaptans, and phosphoramides by reaction with amines. The chlorine and bromine atoms display different degrees of reactivity, so that in many instances partial esters can be selectively prepared. The 2,2-bis-(halomethyl) - 1,3 - propylenebis(phosphorodihalidates) are also advantageously employed as treating agents for cellulosic materials and other substances having a plurality of hydroxy groups, e.g., polyvinyl alcohol, and the sugars and starches. Reaction of these compounds with such materials generally impart flame-proofing properties thereto and, depending upon the nature of the individual 2,2 - bis(halomethyl) - 1,3 - propylenebis(phosphorodihalidate) and the material treated therewith, there will be obtained, in addition to the flame-retardance, an improvement in "hand" and "feel," crease-resistance, etc.

As stated above, the 2,2-bis(halomethyl)-1,3-propylenebis(phosphorodihalidates) are particularly valuable as intermediates or starting materials for the production of mixed halogenated diphosphate esters containing both bromine and chlorine in the ester radicals. Reaction of 2,2 - bis(halomethyl) - 1,3-propylenebis(phosphorodihalidates) are particularly valuable as intermediates or starting materials for the production of mixed halogenated disphosphate esters containing both bromine and chlorine in the ester radicals. Reaction of 2,2-bis(halomethyl)-1,3-propylenebis(phosphorodihalidates) with epoxy compounds, disclosed above, to give mixed halogenated diphosphate esters generally proceeds substantially quantitatively; and since the reaction is one of addition, here again, as in the case of the halogenation reaction there is involved no formation of byproducts. Since production of the halogenated diphosphate esters involves addition of four moles of the epoxy compound to one mole of the 2,2-bis(halomethyl)-1,3-propylenebis(phosphorodihalidate), these reactants are advantageously used in such stoichiometric proportions; however, an excess of the epoxide reactant may be used to insure completion of the reaction since any unreacted material can be separated from the desired diphosphate ester product.

Reaction of the 2,2-bis(halomethyl)-1,3-propylenebis (phosphorodihalidate) with the epoxy compound to give the presently provided halogenated diphosphate esters proceeds at ordinary, decreased or increased temperatures and in the presence or absence of catalysts. The use of catalysts is preferred in that reaction time is thereby substantially decreased, use of a lower reaction temperature is facilitated, and yields of diphosphate ester product are materially improved. As catalysts there may be employed, e.g., such compounds as titanium tetrachloride, zirconium tetrachloride, aluminum chloride, ferric chloride, boron trifluoride, tin tetrachloride, iron filings, ammonium metavanadate, phosphorus trichloride, phosphorus tribromide, pyridine, tri-n-butylamine, quinoline, aniline, N,N-diethylaniline, tetrabutyl titanate, etc. Inert liquid solvents or diluents may or may not be employed. Diluents such as benzene, toluene, hexane, heptane, chloroform, carbon tetrachloride, ethylene dichloride, 1,1,2-trichloroethane, chlorobenzene, etc., may be used and are especially valuable where higher molecular weight compounds are being prepared. The reaction is generally conducted at moderately elevated temperatures; but, depending upon the nature of the individual reactants and upon the nature of the catalyst, temperatures of say, from 0° C. to 150° C. may be used, the preferred temperature being in the 25° C. to 125° C. range. The addition reaction is generally exothermic; hence, in initial runs it is advisable to employ external cooling. Heating may be required to assure completion of the reaction and be desirable throughout the reaction when using the less reactive, higher molecular weight epoxides or when operating either in the absence of a catalyst or in the presence of catalyst materials of comparatively low efficiency. The selection of the proper operating temperature as related to the nature of reactants, catalyst used, and the quantities thereof can easily be arrived at by one skilled in the art.

Step (B) of the process may be satisfactorily conducted by addition of the epoxide reactant to a reaction vessel containing the 2,2 - bis(halomethyl) - 1,3 - propylenebis (phosphorodihalidate). However, in conducting this step of the process it is sometimes preferred to simultaneously add the epoxide and the 2,2-bis(halomethyl)-1,3-propylenebis(phosphorodihalidate) to the reaction vessel containing a solvent or diluent, with the epoxide preferably being added in slight stoichiometric excess, and the temperature being maintained at a level that will promote rapid and complete reaction. The product of the reaction between the epoxide and the 2,2-bis(halomethyl)-1,3-propylenebis(phosphorodihalidate) in some cases can serve as sufficient solvent or diluent for the reaction. Thus, by this process modification the reactants can be added to the reaction vessel substantially continuously until the vessel is filled to the desired capacity with diphosphate ester product, the vessel emptied of some of its contents, and the reaction continued, using some of the product as diluent or solvent.

The presently provided halogenated diphosphate esters are useful for a variety of industrial purposes, e.g., as preignition-inhibiting agents in organo-lead-containing hydrocarbon fuels, such as gasoline compositions used in internal combustion engines, as anti-oxidant, anti-wear, and extreme pressure-imparting additives to hydrocarbon lubricant oil-based compositions. They are particularly useful as modifiers for natural and synthetic polymeric materials. The present halogenated diphosphates possess a high degree of utility as flame retardants for polymeric materials. At the same time, depending upon the quantity of the halogenated diphosphate ester which is in contact with the polymer, plasticizing or softening effect is obtained. Thus, at say a 10% to 50% concentration of the halogenated diphosphate, based upon the total of polymer and phosphate, the polymer generally not only is flameproofed but also plasticized. Use of the present halogenated diphosphates at much lower concentrations, say, in an amount which in some cases is as low as 1.0%, provides many polymeric systems with reduced burning rates. The present halogenated diphosphates may be used with the polymers in a quantity which is equal to that of the polymer, but in most instances favorable results with respect to improvement in flame-retardance and/or plasticity is obtained at concentrations which are definitely lower. It will be evident, of course, that for the preparation of plastisols, quantities of the halogenated diphosphates which are greater than that of the polymer will be required. Use of the present halogenated diphosphate compounds with the polymeric materials in quantities which confer beneficial properties to the polymers with respect to a desired effect, e.g., flexibility in the case of a film, flame-proofing in the case of a foam insulator and extruded fibers or molded pieces, often confers to the polymer an improvement also in such characteristics as resistance to impact, dimensional stability, moldability, etc. Having been provided the present disclosure, these varied effects are readily determinable by those skilled in the art simply by visual observation or by use of conventional techniques. Hence in order to arrive at optimum beneficial effect suited to the purposes for which polymeric composition is designed, only routine testing, involving variation of adjuvant quantity, is generally required, although in some instances one or more members of the whole class of the presently provided halogenated diphosphates will be found to impart a degree of modification at a low concentration which can be attained by other members of the class at significantly higher concentrations.

Fibrous cellulosic products are prime examples of the natural polymeric materials which are advantageously modified by the present halogenated diphosphates. This includes products made of cotton, linen, regenerated cellulose, kapok, hemp, wood and wood pulp, etc., textiles, twines, paper cardboard, pressed board, batting, wood flour, sawdust, etc. Another group of natural polymers of carbohydrate origin includes the starches such as those derived from corn, barley, potato and cassava. Another class of natural polymers with which the present halogenated diphosphates are beneficially used are the natural gums, etc., agar, gum arabic, psyllium seed, tragacanth and gum karaya. Natural rubber is also included. Natural resins modified by the present halogenated diphosphates include shellac, copal, damar, pine balsam, rosin, etc. Proteinaceous polymeric materials, etc. animal glue, casein, wool and leather are also advantageously modified by said halogenated diphosphorus compounds. The natural polymeric products, generally are rendered flame-retardant when contacted with the present halogenated diphosphates in appropriate proportions, and worthy of special note is the glow-proofing of readily ignitable dusts and powders prepared from the natural polymers. Plasticizing effect is conferred by the present halogenated diphosphates to those of the polymers which lack the degrees of softness and flexibility that are required in the applications for which the polymers are destined. When cotton fibers or textiles are treated with halogenated diphosphate compounds, there is not only flame-retardant effect but also an improvement in the "hand" or feel of the fabric.

Synthetic polymeric materials, i.e., those high molecular weight materials which are not found in nature, with which the present halogenated diphosphates are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flame-proofed hereby consists of the polymerized vinyl and vinylidene compounds, i.e., those having the $$CH_2=C<\text{radical}$$

Compounds having such a radical are, e.g., the solid polymeric alkenes, such as polyethylene, polypropylene, polyisobutylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2 - (cyanoethoxy)ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene; polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinylsuccinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present halogenated diphosphates. Examples of such copolymers or terpolymers are those obtained by polymerization of the following monomer mixtures: vinyl chloride-vinyl acetate, acrylonitrile-vinylpyridine, styrene-methyl methacrylate; styrene-N-vinylpyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, >C=C<, are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citraconitrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers or dialkyl fumarate such as ethyl or butyl fumarate and a vinyl compound such as styrene, vinyl acetate, vinylidene chloride, ethyl methacrylate, acrylonitrile, etc.

Readily and advantageously modified by the present halogenated diphosphates are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the present halogenated diphosphates are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer or 2-chlorobutadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinyl-benzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile, are likewise modified in properties by the present halogenated diphosphates to give polymeric materials of enhanced utility.

Polymeric materials with which the present halogenated diphosphates can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinyl phosphine, allyl phosphite and methallyl phosphite, ethylenephosphonic acid and styrene phosphonic acids and their salts, esters and amides; the silanes such as dimethylvinylsilane, diphenylvinylsilane and methylphenylvinylsilane, etc.

A class of synthetic polymeric materials with which the present halogenated diphosphate compounds are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphorus compounds may be incorporated into films of such cellulose derivatives by adding them to the solutions from which the films are cast or into the melts from which the fibers are extruded.

The present halogenated diphosphate are particularly suited to the modification of liquid resin compositions of the polyester type, e.g., the linear polyesters which are obtained by the reaction of one or more polyhydric alcohols with one or more α,β-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrenes such as 3,4-dichlorostyrene, α-chlorostyrene, α-methylstyrene; other vinyl-subtsituted hydrocarbons such as α- or β-vinylnaphthalene or 4-vinylbiphenyl; the olefin carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present compounds are compatible and are advantageously used. These resins are condensation products formed by the reaction of a polyhydroxy compound and epichlorohydrin, which condensation products are subsequently cured by addition of cross-linking agents. The hydroxy compound may be, e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present compounds. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-(β-hydroxyethyl) ether, etc. and/or aminoalcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc., and/or amino- alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600, etc., dipropylene glycol, tripropylene glycol, trithiopropylene glycol, polypropylene glycols 400, 750, 1,200 and 2,000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2,-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,4-naphthalene diisocyanate, etc.

For preparation of the flame retardant polyurethanes, the present phosphorus compounds are preferably added to a mixture of the reactants and catalyst before hardening. The hardened molded pieces or foams are rendered flame-retardant by the inclusion therein of the halogenated diphosphate in quantities of, say, from 2% to 25% by weight of the polyurethane. Simultaneous plasticizing property is evidenced and continues to be demonstrated until the quantity of halogenated diphosphate is substantially equal to that of the polyurethane. Use of the present phosphates in the polyurethane foams can also increase flexibility and, in some applications, improve the mechanical properties of the foams.

Phenolic resins are also beneficially modified by the present halogenated diphosphates, which compounds are incorporated into the resin either by milling in molding applications or by addition to film-forming or impregnating and bonding solutions previous to casting. Phenolic resins with which the present compounds are employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present halogenated diphosphates. Examples thereof are the heat-convertible condensation products of an aldehyde with urea, thiourea guanidine, cyanamide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity of halogenated diphosphate used, they serve to plasticize them, and to render them fire-retardant. When the aminoplasts are destined for use as impregnating agents bonding adhesives, coatings and casting of films, the phosphorus compounds are incorporated into solutions or suspensions in which the aminoplast is carried. The resulting mixtures give strong, fire-retardant laminates when sheets of paper, glass cloth or fabric are impregnated therewith and cured.

Also beneficially modified by the present halogenated diphosphates are the nylons, i.e., the superpolyamides which are generally obtained by the condensation of a diamine, e.g., hexamethylenediamine with a dicarboxylic acid, e.g., adipic acid. Depending upon the quantity of halogenated diphosphate employed and the individual nature of the compound, there are obtained flame-retardant, dye receptor, and/or plasticizing effects.

Other polyamides with which the present halogenated diphosphates are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenylalanine anhydride; the polymeric lactams, e.g., polycaprolactam, piperidone, 2-oxohexamethyleneimine and other cyclic amides. The present halogenated diphosphates can be incorporated into molding or extruding compositions for plasticizing and flame-retardant effect and/or to serve as mold lubricants.

The present halogenated diphosphates are also advantageously employed as adjuvants for polymeric aldehydes, e.g., homopolymeric, high-molecular weight formaldehyde.

The present halogenated diphosphates are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present halogenated diphosphates are plasticizing flame-retardants for such self-condensation products, generally; and where transparentizing effect and dye receptivity are lacking, the phosphates are often instrumental in ameliorating such deficiencies.

The present halogenated diphosphates are likewise advantageously employed with the silicone resins, i.e., the linear polymers which have the repeating unit:

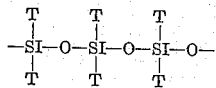

where T denotes an organic radical such as the methyl or phenyl radical, as well as the cross-linked modifications thereof, e.g., cross-linked polymeric divinyltetramethyldisiloxane. The present compounds have a beneficial effect on the mold shrinkage properties and the dimensional stabiilties of the thermo-setting polymers and also impart plasticizing and transparentizing effects. In bonding and laminate applications tensile strength properties of the siloxane resins are improved.

The invention is further illustrated by, but not limited to, the following examples:

*Example 1*

This example illustrates the preparation of a product according to this invention wherein all of the halogen in the product is chlorine.

To a reaction vessel containing 1373.5 g. (10.0 moles) of phosphorus trichloride there was added 545 g. (4.0 moles) of pentaerythritol at room temperature. The mixture was gradually warmed to 80° C. in 3 hours and kept at about 80° C. for 0.5 hour. Concentration of the reaction mixture to 80°/20 mm. to remove hydrogen chloride and unreacted phosphorus trichloride left a viscous residue having a nuclear magnetic phosphorus resonance peak (NMR) for the desired intermediate at −152.0 p.p.m. (relative to $H_3PO_4$) and trace peaks for products of side reactions at −184.7 and −127.2 p.p.m. Carbon tetrachloride (1.5 pounds) was added as a diluent to the above product, and then 581 g. of dry chlorine gas was introduced below the solution surface during 1.6 hours with cooling at 25°–30° C. to give a solution having a major NMR peak for 2,2-bis(chloromethyl)-1,3-propylenebis(phosphorodichloridate) at −5.4 p.p.m. and trace peaks at −3.1 and +3.4 p.p.m. Titanium tetrachloride (5.3 g.) was added to the solution, and then 547 g. of ethylene oxide was added below the solution surface during one hour, cooling at 23°–30° C. The mixture was allowed to warm to 59° C., and then an additional 258 g. of ethylene oxide was added in 1.1 hours as the temperature increased to 86° C. After being warmed at 78–82° for 0.3 hour more, the reaction mixture was concentrated to a pot temperature of 120°/0.2 mm. to give 2336 g. of a yellow liquid consisting largely of 2,2-bis(chloromethyl)-1,3 - propylenebis[bis(2 - chloroethyl)phosphate]; $n_D^{25}$ 1.4904; acidity, 0.015 milliequivalent of NaOH per gram. A portion of the above product was washed once with 15% sodium carbonate solution and four times with water, filtered, and concentrated to 135° C./0.2 mm. to give a 91% yield of colorless liquid; $n_D^{25}$ 1.4899; acidity, 0.002 milliequivalent of NaOH per gram; molecular weight in benzene, 591, as compared to a theoretical of 583; NMR for phosphorus, +2.1 p.p.m.

*Anal.*—Calc'd for $C_{13}H_{24}Cl_6O_8P_2$: C, 26.78; H, 4.15; Cl, 36.55. Found: C, 26.91; H, 4.02; Cl, 36.42.

*Example 2*

This example illustrates the preparation of a product containing both bromine and chlorine.

A dry, 2-liter reaction vessel equipped with a mechanical stirrer, thermometer and a Dry Ice condenser was charged with 687 g. of phosphorus trichloride and 272 g. of pentaerythritol. The mixture was gradually warmed to 80° C. over a three hour period, kept at 80° C. for an additional hour, and then concentrated to 80° C./20 mm. to remove hydrogen chloride and excess phosphorus trichloride. The 547 g. of viscous product thus obtained solidified when cooled to room temperature. It had a major NMR peak for phosphorus at −151.2 p.p.m. and minor peaks at −183.6 p.p.m. and −126.6 p.p.m. The above product was dissolved in 600 g. of carbon tetrachloride, and then 640 g. of bromine was added below the solution surface with cooling at 23–25° C. over a period of 0.8 hour to give a solution having a major phosphorus NMR peak at +15.5 p.p.m. for 2,2-bis(bromomethyl) - 1,3 - propylenebis(phosphorobromidochloridate) and minor peaks at −5.8 p.p.m., +40.5 p.p.m., and +65.8 p.p.m. for products of side reactions. Titanium tetrachloride (2.7 g.) was added to the above intermediate, and then 272 g. of ethylene oxide was introduced below the solution surface during a one hour period while cooling at 25°–30° C. The temperature was permitted to increase to 55° C. and held there until no spontaneous heat rise was noticeable; and then ethylene oxide addition was continued and the temperature allowed to rise to 81° C. A total of 388 g. (10% excess) of ethylene oxide was used. After keeping the temperature at 78°–81° C. for 0.3 hour, carbon tetrachloride solvent was removed to 80° C./20 mm., and then 30 g. of additional ethylene oxide was added as the reaction mixture was warmed to 105° C. and kept at this temperature for 0.5 hour. Concentration to a pot temperature of 120° C./0.3 mm. gave 1536 g. of product as a yellow liquid residue having a phosphorus NMR peak at +2.0 p.p.m. for 2,2-bis(bromomethyl) - 1,3 - propylenebis(2-bromoethyl 2-chloroethyl phosphate) and its isomers, and a minor peak at +8.0 p.p.m. A portion of this product was washed with 15% sodium carbonate solution and then with water until neutral, treated with activated carbon, filtered, and dried by concentration to 100° C. at reduced pressure to give a slightly yellow liquid; $n_D^{25}$ 1.5208; acidity, 0.002 milliequivalent of NaOH per gram.

*Analysis:*

|  | Calc'd for $C_{13}H_{24}Br_4Cl_2O_8P_2$ | Found |
|---|---|---|
| Percent C | 20.53 | 21.01 |
| Percent H | 3.18 | 3.44 |
| Percent Br | 42.15 | 40.47 |
| Percent Cl | 9.32 | 10.17 |
| Percent P | 8.16 | 7.78 |

*Example 3*

A mixture of 606 g. (4.4 moles) of phosphorus trichloride and 272 g. (2.0 moles) of pentaerythritol was warmed gradually to 92° C. in 1.9 hours and then concentrated at 88–94° C./10 mm. for 0.25 hour to remove hydrogen chloride and unreacted phosphorus trichloride. The residue was dissolved in 400 g. of 1,1,2-trichloroethane, and then bromine (608 g., 3.8 moles, 95% of theory) was added below the surface at 20–25° C. until there was permanent retention of bromine color. The resulting solution, consisting principally of 2,2-bis(bromomethyl)-1,3-propylenebis(phosphorobromidochloridate) in 1,1,2-trichloroethane, was then added simultaneously with ethylene oxide (375 g. 8.5 moles) and nitrogen to a flask containing 300 g. of 1,1,2-trichloroethane and 3 g. of titanium tetrachloride kept at 80–85° C. by regulation of the rate of addition of the reactants and by cooling. During this addition, ethylene oxide was kept in slight excess as determined by measurement of both reactants and by observation of slow to moderate reflux from a condenser. After the addition was complete, the solution was warmed at 85–102° C. for 0.3 hour. Excess ethylene oxide was then removed by refluxing the solution at reduced pressure as it cooled. One-half of the resulting solution was then washed twice with 500 g. portions of 5% sodium carbonate solution for 0.75 hour at 40–45° C. and three times with 500 g. portions of water for 0.2 hour at 40–45° C. Concentration to 100° C./10 mm. gave 699 g. (92% yield) of colorless, neutral product consisting principally of 2,2 - bis(bromomethyl)-1,3-propylenebis(2-bromoethyl 2-chloroethyl phosphate) and isomers; $n_D^{25}$ 1.5240; molecular weight found, 743. as against a theory of 760; acidity, 0.001 milliequivalent per gram.

*Example 4*

Phosphorus trichloride (316 g.) and pentaerythritol (136 g.) were placed in a 1-liter flask, and the mixture was stirred and gradually warmed to 75° C. during three hours. An additional 32 g. of phosphorus trichloride was added, and warming was continued at 70–80° C. for one hour. Concentration of this reaction mixture to 80° C./20 mm. gave a viscous product which crystallized when cooled to room temperature. Recrystallization from chloroform gave the essentially pure pentaerythritol ester of phosphorochloridous acid having a single phosphorus NMR peak at −152.2 p.p.m. (relative to $H_3PO_4$).

A 66.3 g. (0.25 mole) portion of recrystallized pentaerythritol ester of phosphorochloridous acid was placed in a 500 cc. flask with 100 g. of carbon tetrachloride, and the mixture was cooled at 20–30° C. as 36.9 g. (0.52 mole) of dry chlorine gas was added below the surface in 0.7 hour. Concentration of the reaction mixture to a pot temperature of 60° C./0.2 mm. gave 101 g. of colorless liquid 2,2-bis(chloromethyl) - 1,3 - propylenebis(phosphorodichloridate), $n_D^{25}$ 1.5079, having a single phosphorus NMR peak at −5.8 p.p.m.

An 81.5 g. (0.20 mole) portion of the 2,2-bis(chloromethyl) - 1,3 - propylenebis(phosphorodichloridate) prepared above and one gram of titanium tetrachloride were placed in a 500 cc. flask and cooled at 30°–40° C. as about 40 g. of 2,3-butylene oxide was added in 0.3 hour. The temperature was allowed to increase to 60° and then the remainder of 63.5 g. (0.88 mole) of 2,3-butylene oxide was added in 0.2 hour as the temperature increased to 105°. The reaction mixture was warmed at 100–105° for 0.25 hour and then concentrated to 120° C./0.5 mm. to give 138.3 g. of yellow liquid which was substantially pure 2,2 - bis(chloromethyl)-1,3-propylenebis[bis(2-chloro-1-methylpropyl) phosphate], having a single phosphorus NMR peak at +2.0 p.p.m.

*Example 5*

Phosphorus trichloride (1373 g., 10 moles) and pentaerythritol (545 g., 4.0 moles) were placed in a 3-liter flask and warmed gradually to 100° C. in 3.8 hours. Carbon tetrachloride (649 g.) was added to aid mixing, and then 564 g. (7.97 moles) of dry chlorine was added below the surface of the mixture which was cooled at 25–32° C. Concentration to a pot temperature of 61° C./0.2 mm. gave 1446 g. of a colorless liquid having a major phosphorus NMR peak at −5.8 p.p.m. for 2,2-bis(chloromethyl) - 1,3 - propylenebis(phosphorodichloridate) and minor peaks at −3.6 p.p.m. and +3.2 p.p.m. for products of side reactions. A 653 g. portion of the above product and 3.3 g. of titanium tetrachloride were dissolved in 1 pound of carbon tetrachloride, and then 597 g. of epichlorohydrin was added gradually at 50°–80° C. during 2 hours. Cooling was required for an additional 0.5 hour to keep the temperature below 87° C. The reaction mixture was distilled until a pot temperature of 105° C. was attained. An additional 30 g. of epichlorohydrin was added and warming was continued at 105–110° C. for 0.5 hour. Concentration to a pot temperature of 120° C./0.1 mm. gave 1216 g. of a yellow viscous liquid which was principallly 2,2 - bis(chloromethyl)-1,3-propylenebis[bis-(2,3-dichloropropyl) phosphate].

*Example 6*

A mixture of 1153 g. of phosphorus trichloride and 545 g. of pentaerythritol was warmed gradually to 100° C. and then concentrated to 90° C./20 mm. The residue was dissolved in 1 kg. of chloroform and treated with 1230 g. of bromine at 20–30° C. during 1.5 hours to obtain a solution consisting principally of 2,2-bis(bromomethyl)-1,3-propylenebis(phosphorobromidochloridate) in chloroform.

A portion of the above brominated solution containing about 2 moles of 2,2-bis(bromomethyl)-1,3-propylenebis-(phosphorobromidochloridate) was placed in a reaction vessel with 5.5 g. of titanium tetrachloride, and 456.6 g. (4.0 moles) of 1-allyloxy-2,3-epoxypropane was added during 1 hour with cooling at 30°–45° C. Heat of reaction kept the temperature at 45°–54° C. for 0.3 hour, and the reaction mixture was stirred for an additional hour to insure complete reaction. To this solution, which contained essentially 2,2-bis(bromomethyl)-1,3-propylenebis(2-bromo - 3 - allyloxypropylphosphorochloridate) and isomers, was added 132 g. of ethylene oxide at 40–82° C. during 1.4 hours. Most of the chloroform was removed at reduced pressure, and then an additional 68 g. of ethylene oxide was added at 80–105° C. The reaction mixture was warmed at 101–102° for 0.5 hour and then concentrated to 135° C./0.4 mm. to give 1715 g. of yellow liquid, $n_D^{25}$ 1.5162, consisting essentially of 2,2-bis(bromomethyl) - 1,3 - propylenebis(2-bromo-3-allyloxypropyl 2-chloroethyl phosphate) and isomers with a major phosphorus NMR peak at +2.5 p.p.m. and a minor peak at +7.6 p.p.m.

*Example 7*

A portion of the brominated solution of Example 6 containing about 0.5 mole of 2,2-bis(bromomethyl)-1,3-propylenebis(phosphorobromidochloridate) was placed in a 1-liter flask with 2.0 g. of titanium tetrachloride. To this mixture there was added 142 g. (1.0 mole) of glycidyl methacrylate, containing 50 parts per million of hydroquinone monomethyl ether as a polymerization inhibitor, during 0.5 hour with cooling at 25°–32° C. The temperature was allowed to increase to 54° C., and it was kept at 40°–54° C. for 1.2 hours after heat of reaction was no longer noticeable. Propylene oxide (70 g., 1.2 moles) was then added in 0.3 hour with cooling at 50°–60° C. The reaction mixture was warmed at 72° C. for 0.5 hour and then concentrated to 105°/0.7 mm. to give 470 g. of yellow viscous residue which consisted principally of 2,2-bis(bromomethyl)-1,3-propylenebis(2-bromo-3-methacryloxypropyl 2-chloropropyl phosphate).

*Example 8*

A mixture of 272 g. (2.0 moles) of pentaerythritol, 366 g. (2.66 moles) of phosphorus trichloride and 600 g. of 1,1,2-trichloroethane was warmed gradually to 100° C. in 3.1 hours. During this warming period a white polymeric material began separating at about 65° C. The polymer suspension was cooled to room temperature and then treated with 426 g. (2.66 moles) of bromine at 25–30° C. in 0.9 hour. Titanium tetrachloride (3 g.) was added to the brominated intermediate, and then 141 g. (3.2 moles) of ethylene oxide was added in 0.6 hour as the temperature increased to 95° C. The reaction mixture was warmed to 100° C. and then about one-third of the solvent and the excess ethylene oxide were removed at reduced pressure. The product solution was washed twice with 500 g. portions of 5% sodium carbonate solution at 40–45° C. for 0.5 hour and four times with water at 40–45° C., filtered, and then concentrated to 80° C./10 mm. to give 792 g. of a mixture of phosphate esters, $n_D^{25}$ 1.5376, containing 45.90% bromine and 0.92% chlorine.

Reasonable variation and modification of the invention as described are within the scope of the invention, the essence of which is that there have been provided (1) methods for preparing flame-retarding chemicals from the reaction product of (a) pentaerythritol and a trivalent phosphorus trihalide, (b) chlorine or bromine, and (c) an epoxide compound as described, (2) 2,2-bis(halomethyl)-1,3-propylenebis(phosphorodihalidates) and methods for preparing them, and (3) halogenated diphosphate esters and methods of making them.

I claim:

1. A process which comprises reacting (a) the pentaerythritol ester of phosphorohalidous acid containing reaction product of pentaerythritol and a trivalent phosphorus trihalide selected from the group consisting of phosphorus trichloride and phosphorus tribromide with (b) a halogen selected from the group consisting of bromine and chlorine to form as a resulting reaction product a compound of the formula

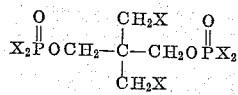

wherein each X denotes a halogen selected from the group consisting of bromine and chlorine.

2. A process which comprises reacting (a) the pentaerythritol ester of phosphorochloridous acid containing reaction product of pentaerythritol and phosphorus trichloride with (b) bromine to form as a resulting reaction product a compound of the formula

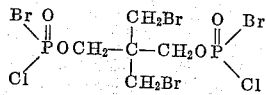

3. A process which comprises reacting (a) the pentaerythritol ester of phosphorochloridous acid containing reaction product of pentaerythritol and phosphorus trichloride with (b) chlorine to form as a resulting reaction product a compound of the formula

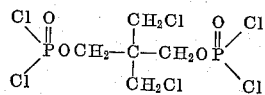

4. A process for preparing organophosphorus compounds which comprises reacting (a) the pentaerythritol ester of phosphorohalidous acid containing reaction product of pentaerythritol and a phosphorus trihalide selected from the group consisting of phosphorus tribromide and phosphorus trichloride with (b) a halogen selected from the group consisting of chlorine and bromine to form a 2,2-bis(halomethyl)-1,3-propylenebis(phosphorodihalidate) reaction product (c), and reacting the reaction product (c) with at least one epoxide compound of the formula

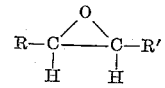

wherein R is selected from the group consisting of hydrogen, hydrocarbyl, chlorohydrocarbyl, bromohydrocarbyl, hydrocarbyloxyalkyl, and -hydrocarbyl-C(O)O-alkyl and R' is selected from the group consisting of hydrogen, lower alkyl, and lower haloalkyl radicals and is hydrogen when R is hydrocarbyloxyalkyl and when R is hydrocarbyl-C(O)O-alkyl in an amount sufficient to react with at least some of the halogen atoms selected from the group consisting of bromine and chlorine bonded to the phosphorus atoms of the reaction product (c), the epoxides used being selected so that the ester moieties bonded to the phosphorus atoms of the resulting product have an average of from 2 to about 12 carbon atoms therein, with no R moiety having over 20 carbon atoms therein.

5. A process according to claim 4 wherein reaction product (c) is contacted and reacted with a sufficient amount of an epoxide compound of the formula

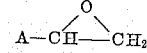

wherein A is a hydrocarbyl-C-(O)O-alkyl to react with about one-half of the halogen atoms bonded to phosphorus, and then with an epoxide of the formula

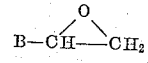

wherein B is a hydrocarbyl to react with the remaining halogen atoms bonded to phosphorus.

6. A process according to claim 4 wherein reaction product (c) is contacted and reacted with a sufficient amount of an epoxide compound of the formula

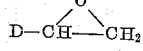

wherein D is a hydrocarbyloxyalkyl to react with about one-half of the halogen atoms bonded to phosphorus, and then with ethylene oxide to react with the remaining halogen atoms bonded to phosphorus.

7. A process according to claim 4 wherein R is a chlorohydrocarbyl having up to 20 carbon atoms and R' is hydrogen.

8. A process according to claim 4 wherein R is a hydrocarbyl having up to 20 carbon atoms and R' is a lower alkyl radical.

9. A process according to claim 4 wherein the reaction product (c) and the epoxide compound are simultaneously introduced into a reaction vessel containing a diluent.

10. A process which comprises reacting (a) the pentaerythritol ester of phosphorochloridous acid containing reaction product of pentaerythritol and phosphorus trichloride with (b) bromine to form as a resulting reaction product (c) 2,2-bis(bromomethyl)-1,3-propylenebis-(phosphorobromidochloridate), and reacting the resulting reaction product (c) with ethylene oxide to form 2,2-bis(bromomethyl)-1,3-propylenebis(2-bromomethyl 2-chloroethyl phosphate).

11. A process which comprises reacting (a) the pentaerythritol ester of phosphorochloridous acid containing reaction product of pentaerythritol and phosphorus trichloride with (b) bromine to form as a resulting reaction product (c) 2,2-bis(bromomethyl)-1,3-propylenebis-(phosphorobromidochloridate), and reacting the resulting reaction product (c) with a 2,3-epoxypropyl methacrylate to react with the bromine atoms bonded to phosphorus, and then with propylene oxide to react with the chlorine atoms bonded to phosphorus.

12. A compound of the formula

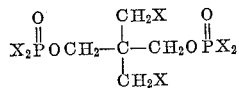

wherein each X is selected from the group consisting of bromine and chlorine.

13. A compound of the formula

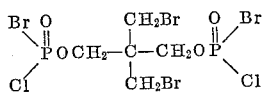

14. A compound of the formula

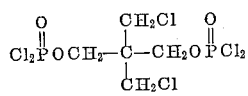

15. The compound of the formula

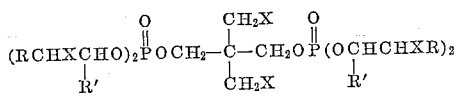

wherein each X is selected from the group consisting of bromine and chlorine, each R is selected from the group consisting of hydrogen, hydrocarbyl, chlorohydrocarbyl, bromohydrocarbyl, hydrocarbyloxyalkyl and hydrocarbyl-C(O)O-alkyl and each R' is selected from the group consisting of hydrogen, lower alkyl, and lower haloalkyl, and is hydrogen when R is hydrocarbyloxyalkyl and when R is hydrocarbyl-C(O)O-alkyl R and R' being selected so that the ester moieties bonded to the phosphorus atoms have an average of from 2 to about 12 carbon atoms, with no R having over 20 carbon atoms therein.

16. A compound according to claim 15 where R is a chlorohydrocarbyl radical and R' is hydrogen.

17. A compound of the formula

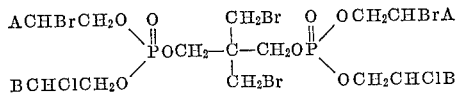

wherein A is a hydrocarbyl-C(O)O-alkyl and B is a hydrocarbyl, said A and B being selected so that the ester moieties bonded to the phosphorus atoms have an average of from 2 to about 12 carbon atoms, with no such moiety having over 20 carbon atoms therein.

18. A compound of the formula

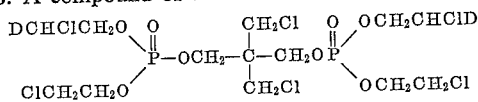

wherein D is a hydrocarbyloxyalkyl said D being selected so that the ester moieties bonded to the phosphorus atoms have an average of from 2 to about 12 carbon atoms, with no such moiety having over about 20 carbon atoms therein.

19. 2,2 - bis(bromomethyl)-1,3-propylenebis[2-bromo-3-methacryloxypropyl 2-chloropropyl phosphate].

20. 2,2 - bis(chloromethyl) - 1,3 - propylenebis[bis(2-chloroethyl) phosphate].

21. 2,2-bis(chloromethyl) - 1,3 - propylenebis(2-chloro-3-allyloxypropyl 2-chloroethyl phosphate).

22. 2,2 - bis(bromomethyl)-1,3-propylenebis(2-bromoethyl 2-chloroethyl phosphate).

23. 2,2 - bis(chloromethyl) - 1,3 - propylenebis[bis(2-chloro-1-methylpropyl) phosphate].

24. 2,2-bis(chloromethyl) - 1,3 - propylenebis[bis(2,3-dichloropropyl) phosphate].

25. A process which comprises reacting (a) the reaction product of a phosphorus trihalide selected from the group consisting of phosphorus trichloride and phosphorus tribromide and pentaerythritol combined in a molar proportion of at least about one and one-third moles of said phosphorus trihalide per mole of pentaerythritol with (b) a halogen selected from the group consisting of bromine and chlorine.

26. The product obtained according to the process described in claim 25.

27. The process described in claim 25 wherein the phosphorus trihalide is phosphorus trichloride and the halogen (b) is bromine.

28. The product obtained according to the process described in claim 27.

References Cited by the Examiner

UNITED STATES PATENTS

| | | | |
|---|---|---|---|
| 2,632,767 | 3/53 | Smith et al. | 260—461.303 |
| 2,782,128 | 2/57 | Paist et al. | 260—461.303 |

FOREIGN PATENTS 680,223  10/52  Great Britain.

OTHER REFERENCES

Kosolapoff: "Organophosphorus Compounds," 1950, pp. 195–214, John Wiley and Sons, Inc., New York, N.Y.

CHARLES B. PARKER, *Primary Examiner.*

LEWIS GOTTS, *Examiner.*